(12) United States Patent
Hubert et al.

(10) Patent No.: US 7,291,815 B2
(45) Date of Patent: Nov. 6, 2007

(54) COMPOSITE ICE PROTECTION HEATER AND METHOD OF PRODUCING SAME

(75) Inventors: Claude M. Hubert, Riverside, CA (US); Daniel P. Christy, Akron, OH (US)

(73) Assignees: Goodrich Corporation, Charlotte, NC (US); Rohr Inc., Chula Vista, CA (US)

( * ) Notice: Subject to any disclaimer, the term of this patent is extended or adjusted under 35 U.S.C. 154(b) by 0 days.

(21) Appl. No.: 11/276,344

(22) Filed: Feb. 24, 2006

(65) Prior Publication Data

US 2007/0210073 A1 Sep. 13, 2007

(51) Int. Cl.
*H05B 3/58* (2006.01)

(52) U.S. Cl. ........................ 219/535; 219/529

(58) Field of Classification Search .............. 219/535, 219/529, 201, 211, 520, 542; 244/134 D; 416/95

See application file for complete search history.

(56) References Cited

U.S. PATENT DOCUMENTS

| | | | | |
|---|---|---|---|---|
| 2,496,279 | A | * | 2/1950 | Ely et al. ................... 219/528 |
| 3,178,560 | A | * | 4/1965 | Mapp et al. ................ 219/528 |
| 3,349,359 | A | * | 10/1967 | Morey ........................ 338/208 |
| 3,800,121 | A | | 3/1974 | Dean et al. |
| 3,935,422 | A | * | 1/1976 | Barnes et al. .............. 219/213 |
| 4,021,008 | A | * | 5/1977 | Eichenauer ............. 244/134 D |
| 4,036,457 | A | | 7/1977 | Volkner et al. |
| 4,062,917 | A | | 12/1977 | Hill et al. |
| 4,291,079 | A | | 9/1981 | Hom |
| 4,514,619 | A | | 4/1985 | Kugelman |
| 4,737,618 | A | | 4/1988 | Barbier et al. |
| 4,743,740 | A | | 5/1988 | Adee |
| 4,837,618 | A | | 6/1989 | Hatori et al. |
| 4,942,078 | A | | 7/1990 | Newman et al. |
| 4,972,197 | A | | 11/1990 | McCauley et al. |
| 5,192,605 | A | | 3/1993 | Mercuri et al. |
| 5,344,696 | A | * | 9/1994 | Hastings et al. ............ 428/220 |
| 5,356,096 | A | * | 10/1994 | Rauckhorst et al. ..... 244/134 A |

(Continued)

OTHER PUBLICATIONS

R.E. Evans, D.E. Hall and B.A. Luxon, Nickel Coated Graphite Fiber Conductive Composites, SAMPE Quarterly, vol. 17, No. 4, Jul. 1986.

*Primary Examiner*—Tu Sa Hoang
*Assistant Examiner*—Vinod Patel
(74) *Attorney, Agent, or Firm*—Jack B. Hicks; Womble Carlyle Sandridge & Rice, PLLC

(57) ABSTRACT

The invention includes a composite ice protection heater for an aircraft. The composite heater includes at least one electrically insulating layer, and at least one electric heater element comprising an electrically conductive layer bonded to the insulating layer. The conductive layer may include a pre-impregnated woven fabric that includes a plurality of threads that include an electrically conductive material, such as carbon or graphite fibers. The composite heater can be incorporated into a composite surface structure of an aircraft. The conductive layer and insulating layer may include a plurality of spaced openings through the layers that cooperate with an underlying open-cell matrix to attenuate noise at the associated surface of an aircraft. A desired electrical resistance of the conductive layer may be obtained by introducing a plurality of discontinuities in the layer, such as spaced holes or slits.

13 Claims, 14 Drawing Sheets

U.S. PATENT DOCUMENTS

| | | |
|---|---|---|
| 5,361,183 A | 11/1994 | Wiese |
| 5,427,332 A * | 6/1995 | Rauckhorst et al. ..... 244/134 A |
| 5,475,204 A | 12/1995 | Giamati et al. |
| 5,584,450 A | 12/1996 | Pisarski |
| 5,653,836 A | 8/1997 | Mnich et al. |
| 5,657,951 A | 8/1997 | Giamati |
| 5,765,779 A * | 6/1998 | Hancock et al. ........ 244/134 D |
| 5,824,996 A | 10/1998 | Kockman et al. |
| 5,925,275 A | 7/1999 | Lawson et al. |
| 5,934,617 A | 8/1999 | Rutherford |
| 5,942,140 A | 8/1999 | Miller et al. |
| 5,947,418 A | 9/1999 | Bessiere et al. |
| 5,971,323 A | 10/1999 | Rauch et al. |
| 6,031,214 A | 2/2000 | Bost et al. |
| 6,054,690 A * | 4/2000 | Petit et al. .................. 219/528 |
| 6,094,907 A | 8/2000 | Blackner |
| 6,137,083 A | 10/2000 | Bost et al. |
| 6,145,787 A | 11/2000 | Rolls |
| 6,194,685 B1 | 2/2001 | Rutherford |
| 6,330,986 B1 * | 12/2001 | Rutherford et al. ..... 244/134 E |
| 6,338,455 B1 | 1/2002 | Rauch et al. |
| 6,371,242 B1 | 4/2002 | Wilson et al. |
| 6,403,935 B2 | 6/2002 | Kockman et al. |
| 6,483,087 B2 | 11/2002 | Gardner et al. |
| 6,521,873 B1 | 2/2003 | Cheng et al. |
| 6,848,656 B2 * | 2/2005 | Linton .................... 244/134 C |
| 6,870,139 B2 | 3/2005 | Petrenko |
| 7,034,257 B2 | 4/2006 | Petrenko |
| 7,078,658 B2 * | 7/2006 | Brunner et al. ............. 219/529 |
| 2002/0096506 A1 | 7/2002 | Moreland et al. |
| 2003/0222077 A1 | 12/2003 | Suda et al. |
| 2003/0234248 A1 | 12/2003 | Kano et al. |
| 2004/0065659 A1 | 4/2004 | Tse |
| 2004/0069772 A1 | 4/2004 | Kondo et al. |
| 2004/0074899 A1 | 4/2004 | Mariner et al. |
| 2004/0237502 A1 | 12/2004 | Moe et al. |
| 2005/0006529 A1 | 1/2005 | Moe et al. |
| 2005/0178924 A1 | 8/2005 | Bertolotti |
| 2005/0189345 A1 | 9/2005 | Brunner et al. |
| 2006/0032983 A1 | 2/2006 | Brand et al. |

* cited by examiner

COMPOSITE ICE PROTECTION HEATER AND METHOD OF PRODUCING SAME

FIELD OF THE INVENTION

The invention relates to anti-icing/de-icing systems for aircraft, and more particularly relates to a moldable composite ice protection heater that can include noise attenuating perforations, and a method of producing such a heater.

BACKGROUND

Aircraft regulations require designers to consider flight conditions that contribute to ice formation and ice accumulation on critical portions of the aircraft. Leading edges of wings and engine nacelles can be particularly susceptible to ice formation, and require active ice protection in many aircraft designs. With respect to aircraft engines, accumulated ice can break away from the lip of the nacelle inlet, and enter the engine. Ice entering an engine can damage an engine's fan blades, or other critical engine components. Ice formation and accumulation on a nacelle inlet lip also can restrict airflow, thereby hindering engine performance. Accordingly, ice protection systems are needed for wing leading edges and engine nacelles in general, and for nacelle inlet lips in particular.

Various systems and methods are known for minimizing and eliminating ice accumulations on critical surfaces of aircraft. For example, the airport crews commonly spray an ethylene glycol de-icing solution on accumulated ice on aircraft wings while the aircraft are on the ground preparing for departure. Alternatively, some aircraft are equipped with pneumatically actuated bladders along leading edge surfaces of their wings that can be periodically inflated to shed accumulated ice. Many jet aircraft direct hot gases from their engine compressors onto the wing or nacelle inlet leading edges to melt accreted ice. Though such hot gas systems can generally be effective, such systems are not available for aircraft that do not have jet engines, or aircraft that do not have sufficient hot air capacity for such purposes.

Another method of preventing and/or eliminating ice from aircraft leading edges employs resistance-heating elements positioned along an aircraft's leading edges. Such electrothermal systems use various types of electric heating elements that are affixed on a surface structure of an aircraft. For example, the heating elements may include metallic electrodes arranged in a serpentine pattern, and affixed to a substrate that is attached to a surface structure of an aircraft. Other similar systems use ribbons or sheets of electrically conductive material as heating elements. Such systems commonly include heating elements that are intermittently spaced along an aircraft surface in a manner such that individual heaters can be selectively energized. Because most aircraft have limited available electrical power, the individual heating elements or sets of heating elements can be sequentially energized to conserve the amount of power consumed at any one time during a heating cycle.

An airplane's airframe and engines produce varying amounts of audible noise during takeoffs and landings. For example, an aircraft's engines typically operate at or near maximum thrust as the aircraft departs from or approaches an airport. Aircraft engine fan noise can be at least partially suppressed at the engine nacelle inlet by a noise absorbing liner. Such liners are provided inside of and proximate to the nacelle inlet. These liners can convert acoustic energy into heat, and typically consist of a porous skin supported by an open-cell honeycomb matrix. The open-cell matrix provides separation between the porous skin and a non-perforated backskin. Some have postulated that the partially open cells of the liner create a Helmholtz resonant effect that absorbs sonic energy, and thereby effectively suppresses at least a portion of the generated engine noise. Government regulators often mandate aircraft engines with reduced noise signatures, and as a result, aircraft manufacturers, airline companies, and airport communities frequently demand such engines on aircraft.

Though electrothermal systems can be effective in preventing ice formation or shedding ice from various sensitive areas of aircraft, such systems generally do not provide for noise attenuation, such as is beneficial at the lip of an engine nacelle inlet. Conversely, prior art noise attenuation systems for aircraft generally do not provide ice protection for leading edges of the aircraft. Accordingly, there is a need for an electrothermal ice protection system for the leading edges of aircraft that also includes noise attenuation capability. In particular, there is a need for an electrothermal ice protection apparatus for a nacelle inlet noselip that is capable of attenuating at least some engine fan noise.

SUMMARY

The invention includes a method of producing a composite heater for the inlet lip of an aircraft engine nacelle. The method includes enveloping at least a first electrically conductive sheet layer between at least first and second electrically insulating layers, and bonding the layers together. The method further includes introducing a plurality of spaced openings through the first and second insulating layers and the first electrically conductive sheet layer. As used herein, the term "opening" means a hole, slit, perforation or the like that extends through an otherwise substantially continuous element.

The invention also includes a noise-attenuating ice protection heater for an aircraft. The heater includes at least one electrically insulating layer, and at least one electric heater element comprising an electrically conductive layer bonded to the insulating layer. The electrically conductive layer may include electrically conductive graphite, for example. The electrically conductive layer and insulating layer include a plurality of noise attenuating spaced openings therethrough.

The invention further includes a noise-attenuating ice protection system for a leading edge of an aircraft, such as the leading edge of an engine nacelle inlet noselip. The system includes a laminated composite skin structure forming at least a portion of the leading edge, and at least one conductive sheet embedded within the laminated composite skin structure. The laminated composite skin structure and embedded conductive sheet include a plurality of spaced noise-attenuating openings therethrough.

The invention also includes a noise-abating, selectively heatable nacelle inlet lip for an aircraft engine. The lip includes a contoured skin structure comprising a plurality of composite layers, and at least one electrically conductive sheet bonded between at least two of the composite layers. A spaced array of openings extend through the plurality of composite layers and the electrically conductive sheet, and are configured to dissipate at least some acoustic energy at the inlet of the aircraft engine nacelle.

The invention further includes a composite ice protection heater for a surface of an aircraft. The heater includes a sheet of electrically conductive woven composite fabric. The woven fabric includes a plurality of threads that include an electrically conductive carbon-based material, such as graphite fibers. A pair of opposed bus strips are disposed in electrical contact with at least some of the electrically conductive threads. The woven fabric may include a plurality of openings, perforations, slits, or the like that create discontinuities in at least some of the electrically conductive threads, and provide the fabric with a desired electrical resistance. The electrically conductive threads may be woven in the fabric in a single direction, or in both a warp and fill direction. The electrically conductive threads may be intermittently woven within the fabric together with other non-conductive threads. The conductive threads may be variously spaced apart within the woven fabric.

The invention also includes an ice protection heater for an aircraft that includes heating means for selectively dissipating thermal energy proximate to a portion of a surface of an aircraft. The heater also includes electrical insulating means for electrically insulating the heating means from electrically conductive objects. The heating and insulating means include noise attenuating means for dissipating at least some acoustic energy proximate to the portion of the surface of the aircraft.

These and other aspects of the invention will be understood from a reading of the following detailed description together with the drawings.

DETAILED DESCRIPTION

Figure 1:
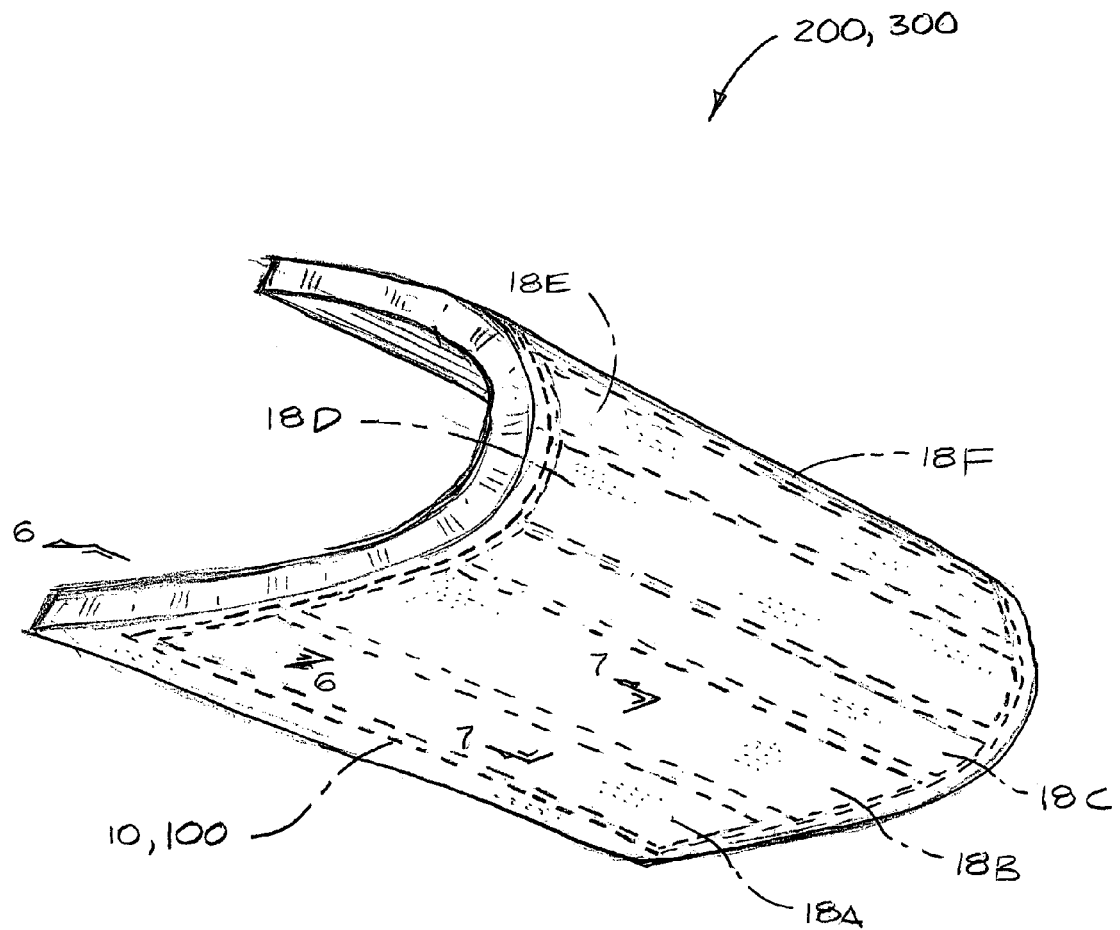
FIG. 1 is a perspective view of one embodiment of a composite structure for the leading edge of an aircraft that includes a composite ice protection heater apparatus according to the invention.

FIG. 1 shows a composite surface structure 200, 300 for the leading edge of an aircraft. In one embodiment, the composite surface structure 200, 300 is a segment of an aircraft engine nacelle inlet lip. In the embodiment shown, the surface structure 200, 300 includes a composite ice protection heater portion 10, 100. In the embodiment of FIG. 1, the composite heater portion 10, 100 is integrally incorporated into the composite surface structure 200, 300. As shown in FIG. 1, the heater portion 10, 100 may include a plurality of spaced electrical heater elements 18A-18F. The heater elements 18A-18F may be collectively or individually energized to prevent and/or eliminate ice formation on the leading edge of the structure 200, 300 during service.

Figure 2:
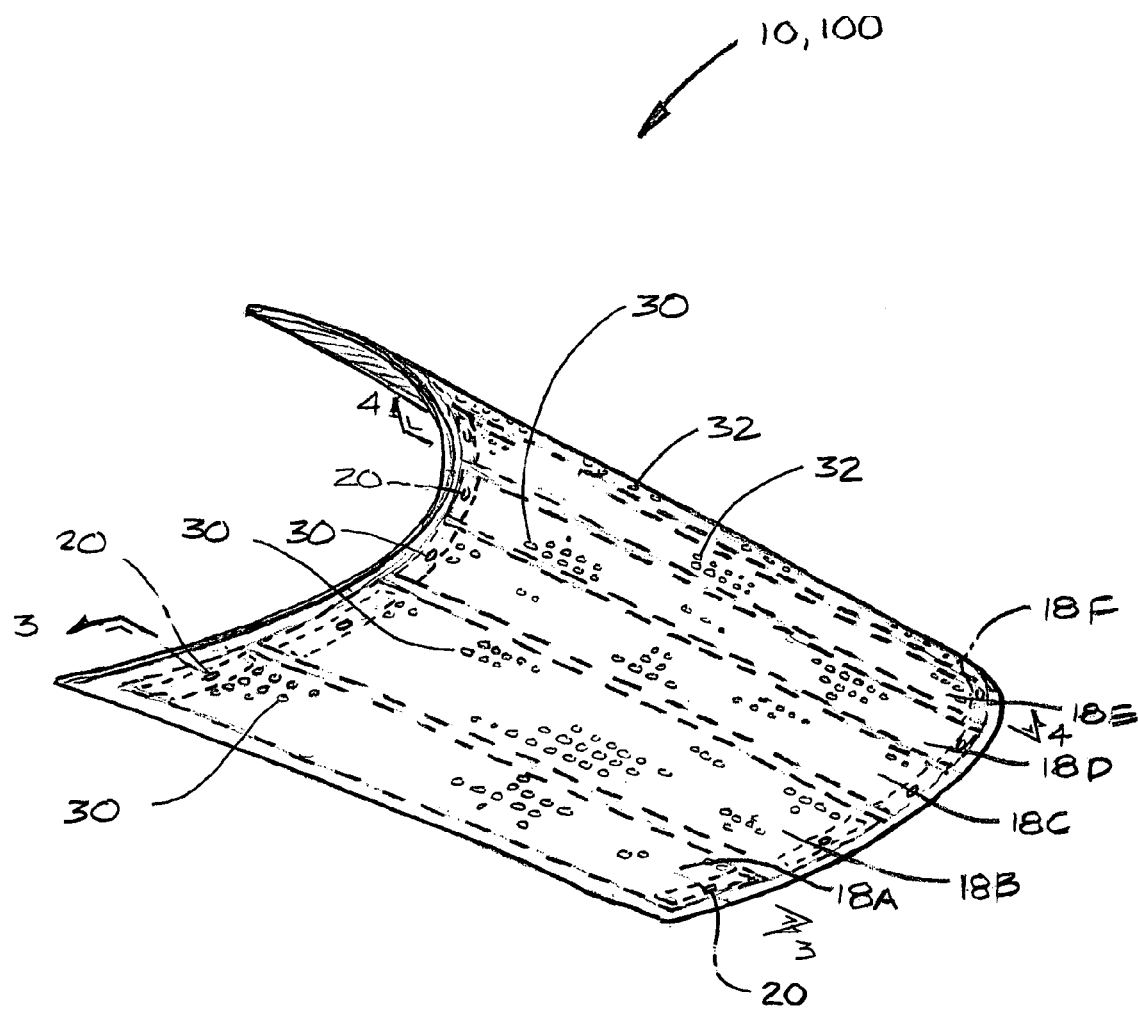
FIG. 2 is a perspective view of one embodiment of the composite ice protection heater apparatus portion of the composite structure shown in FIG. 1.

FIG. 2 shows one embodiment of a moldable composite electrothermal heating apparatus 10, 100 according to the invention. The generally thin and generally flexible heater apparatus 10, 100 forms a moldable sheet capable of conforming to at least a portion of a surface contour of an external surface of an aircraft. The composite heater apparatus 10, 100 can be constructed such that the heater 10, 100 is substantially flat in an unrestrained state. Alternatively, the heater apparatus 10, 100 can be constructed such that the heater 10, 100 has a desired three-dimensional, non-flat shape in an unrestrained state (like that shown in FIG. 2, for example). In either embodiment, the composite heater apparatus 10, 100 is capable of conforming to an underlying aircraft support surface or structure, such as an inlet lip of an aircraft engine nacelle.

As shown in FIG. 2, the composite heater apparatus 10, 100 can include a plurality of spaced openings 30 that extend through the entire thickness of the heater. The composite heater 10, 100 may also include at least some openings 32 that extend only partially through the thickness of the heater 10, 100. The spaced openings 30, 32 can serve two functions. First, the spaced openings 30, 32 may provide each heater element 18A-18F with a desired degree of electrical resistance, such that when energized, each heater element imparts a desired level of resistance heating to an associated surface of an aircraft. In addition, the spaced openings 30, 32 may act to attenuate at least some aircraft noise by absorbing or dissipating at least some acoustic energy at or near the surface of the heater 10. The spaced openings 30, 32 may have any desired size or shape, and may be arranged in any desired array or pattern in the composite heater apparatus 10, 100. In addition, the openings 30, 32 may be spaced over substantially the entire extent of the heater 10, 100, or may be provided in only select portions of the heater apparatus 10, 100. In the embodiment shown in FIG. 2, the heater apparatus 10, 100 includes six span-wise heating elements 18A-18F (indicated by dashed lines). In this embodiment, the full openings 30 are spaced over substantially all of heating elements 18A-18D, and the partial openings 32 are provided in heating elements 18E and 18F. As described in detail below, the full openings 30 can be provided in those heater elements 18 that are located in surface regions of the heater structure 10, 100 where at least some noise attenuation is desired. Conversely, partial openings 32 can be provided in those heater elements that are located in surface regions where noise attenuation is either unnecessary or less desirable.

In one embodiment of the invention, the openings 30, 32 are holes that are about 0.1 inch in diameter, and are substantially equally spaced on about 0.15 inch centers. Accordingly, in this embodiment, the openings 30, 32 consume slightly less than about 30 percent of the total surface area of the heater assembly 10, 100. In other words, the openings 30, 32 define a percent of open area (POA) of nearly 30 percent. Smaller or larger hole diameters and center spacings, as well as percentages of POA also may be used, as desired.

Figure 3:
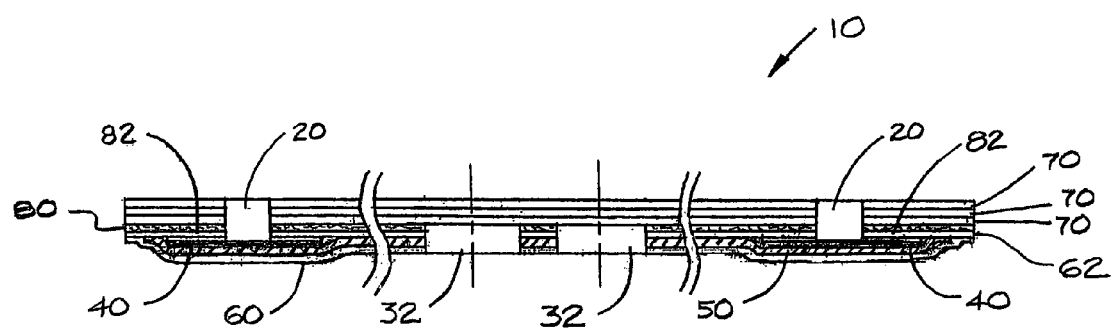
FIG. 3 is a cross section of the composite heater apparatus of FIG. 2 as taken along line 3-3 in FIG. 2.
Figure 4:
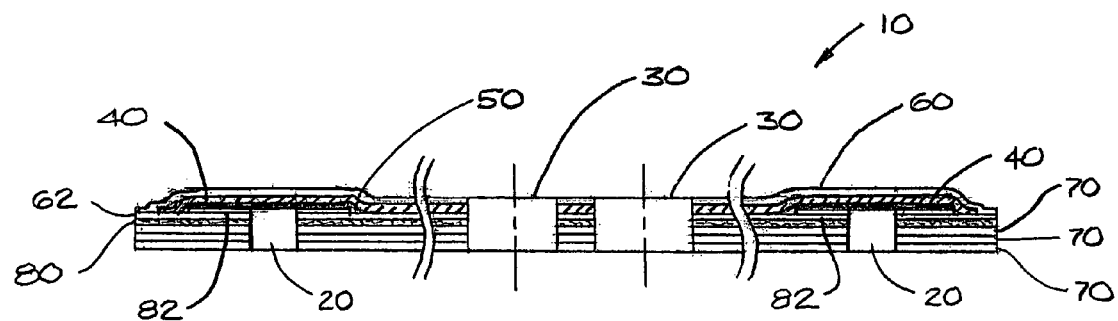
FIG. 4 is a cross section of the composite heater apparatus of FIG. 2 as taken along line 4-4 in FIG. 2
Figure 5:
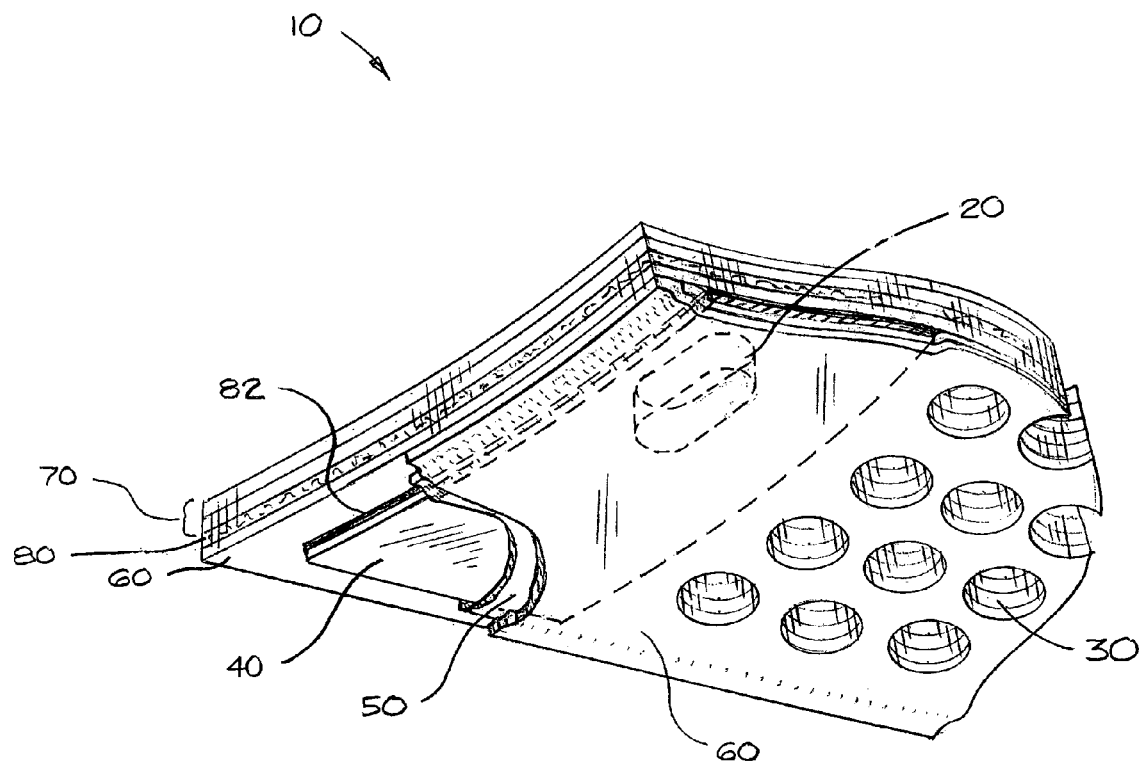
FIG. 5 is a perspective view of a portion of the composite heater apparatus of FIG. 2 showing layers of one embodiment of the composite structure.

FIGS. 3-5 show enlarged details of one representative laminated composite construction of a heater apparatus 10 like that shown in FIG. 2. In this construction, the heater apparatus 10 includes at least one outermost electrically insulating layer 60 covering at least one underlying electrically conductive layer 50. The outermost insulating layer 60 may include one or more plies of low dielectric glass cloth that are pre-impregnated with a suitable curable resin. Suitable resins include, but are not limited to, epoxy resins, cynate esters, phenolic resins, bismaleimide (BMI) resins, polyimide resins, and the like. The type of curable resin used may be based upon the maximum anticipated service temperature of the heater apparatus 10. For example, phenolic resins may be used for maximum service temperatures up to about 225° F., cynate esters for temperatures up to about 250° F., epoxy resins for temperatures up to about 300° F., BMI resins for temperatures up to about 400° F., and polyimide resins for temperatures up to about 550-650° F. For example, the insulating layer 60 may include one or more plies of Style 120 pre-impregnated woven E-glass fabric of a type that is well known in the art. Alternatively, the insulating layer 60 may include one or more plies of Style 7781 E-glass woven fabric prepreg, of a type that is well known in the art. Alternatively, the electrically insulating layer 60 may be constructed of any other suitable electrically insulating material. Suitable electrically insulating layers 60 preferably have a dielectric constant less than or equal to about 7, and a dielectric tangent less than or equal to about $12 \times 10^{-4}$ at a frequency of about 1 MHz at room temperature.

Preferably, the electrically conductive layer 50 is a sheet that includes a carbon-based material such as graphite fibers. For example, the sheet 50 may be a single layer of an electrically conductive woven or unidirectional graphite fabric or tape impregnated with a suitable curable resin. Suitable resins include, but are not limited to, epoxy resins, cynate esters, phenolic resins, bismaleimide (BM) resins, polyimide resins, and the like. The type of resin used may be selected based upon the maximum anticipated service temperature of the heater 10, as described above regarding the insulating layers 60. Alternatively, the electrically conductive layer 50 may include plural layers of electrically conductive woven and/or unidirectional graphite fabrics or tapes. For example, the electrically conductive layer 50 may include a first layer of a woven graphite fabric, and a thinner second layer of unidirectional graphite tape. A combination of plural layers of woven and/or unidirectional non-woven graphite fabric sheets or tapes may be used to yield an electrically conductive layer 50 having desired electrical characteristics, such as electrical resistance.

Alternatively, the electrically conductive layer 50 may be any substantially continuous conductive material that is capable of conducting an electric current when subjected to an electric potential, and that is capable of receiving a plurality of spaced openings therethrough without adversely affecting the material's ability to conduct an electric current. Other materials with these characteristics are known to persons skilled in the art.

Figure 6A:
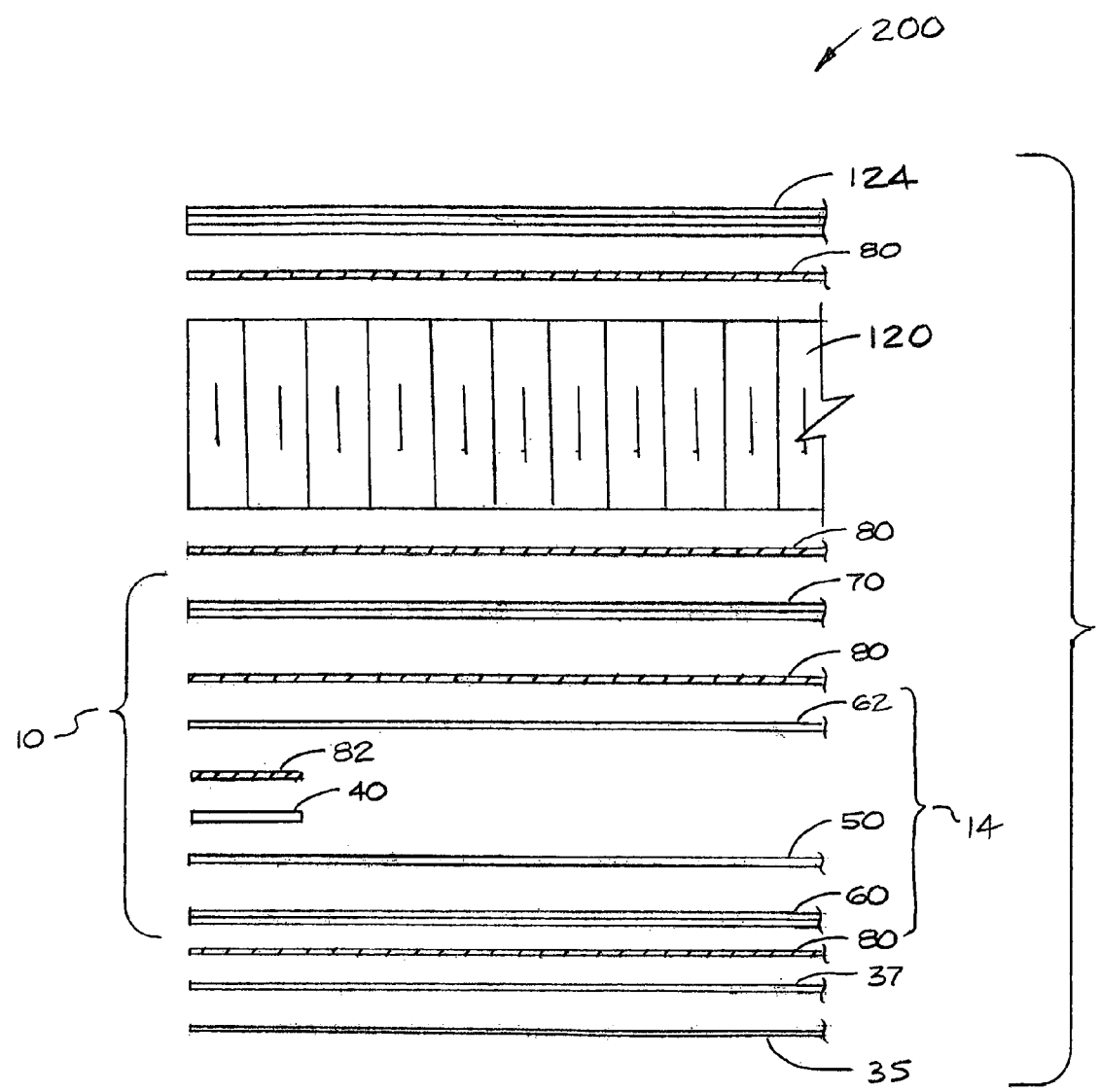
FIG. 6A is an exploded cross sectional view of one embodiment of the composite structure of FIG. 1 as taken along line 6-6 in FIG. 1, showing details of the composite construction.
Figure 6B:
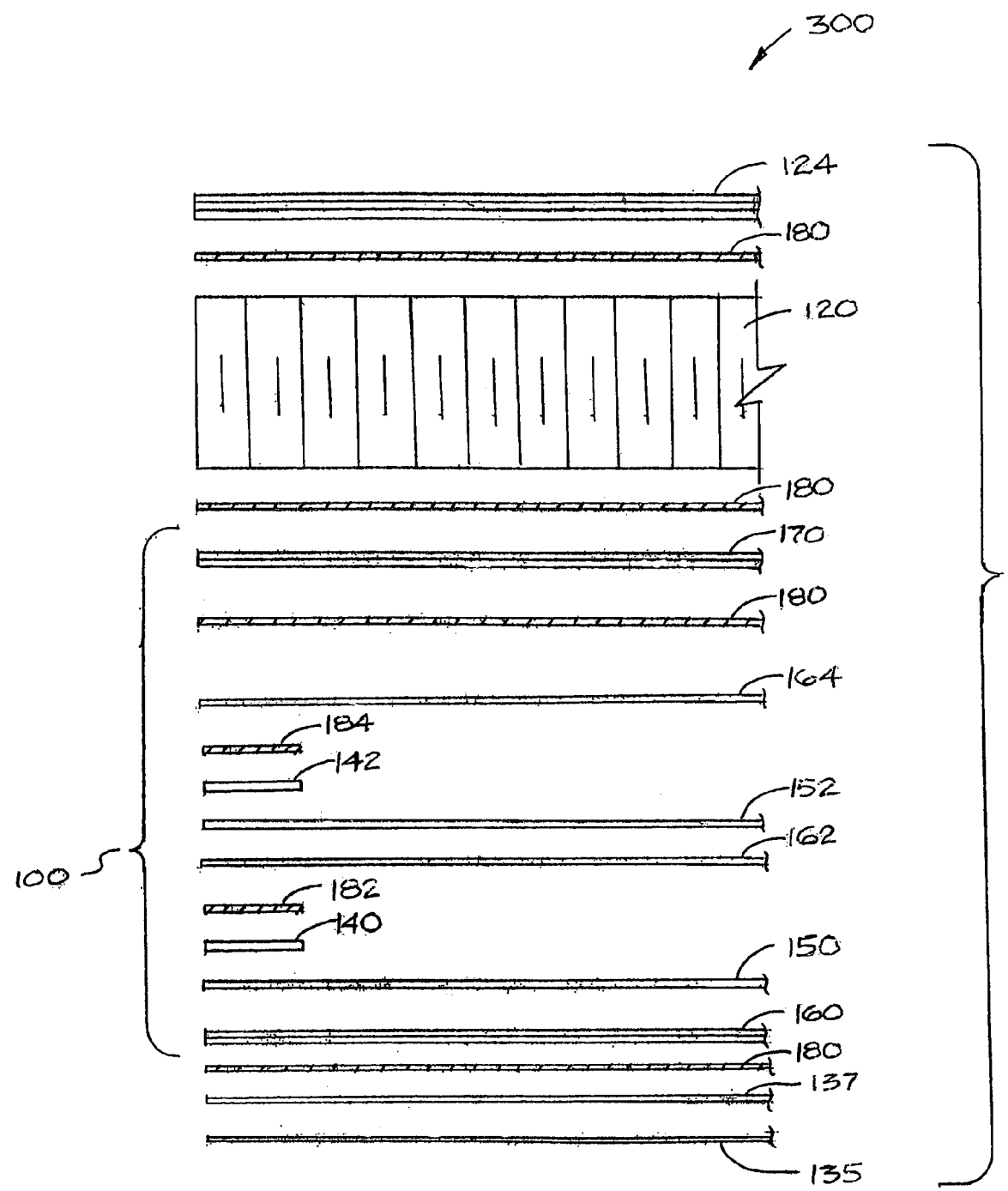
FIG. 6B is an exploded cross sectional view of another embodiment of the composite structure of FIG. 1 as taken along line 6-6 in FIG. 1, showing details of the composite construction.
Figure 7A:
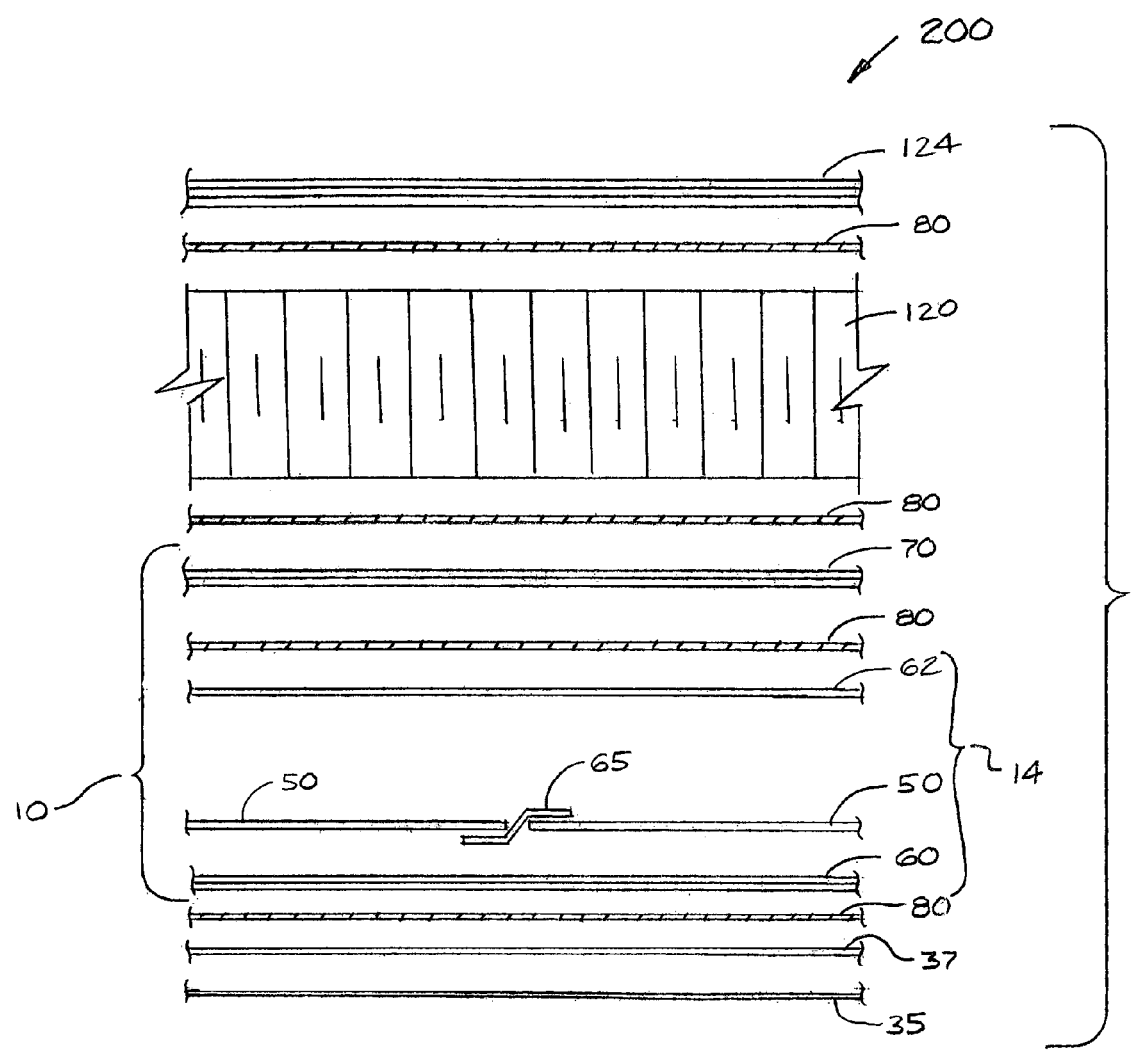
FIG. 7A is an exploded cross sectional view of the embodiment of the composite structure of FIG. 6A as taken along line 7-7 in FIG. 1, showing layers of the composite construction.
Figure 8:
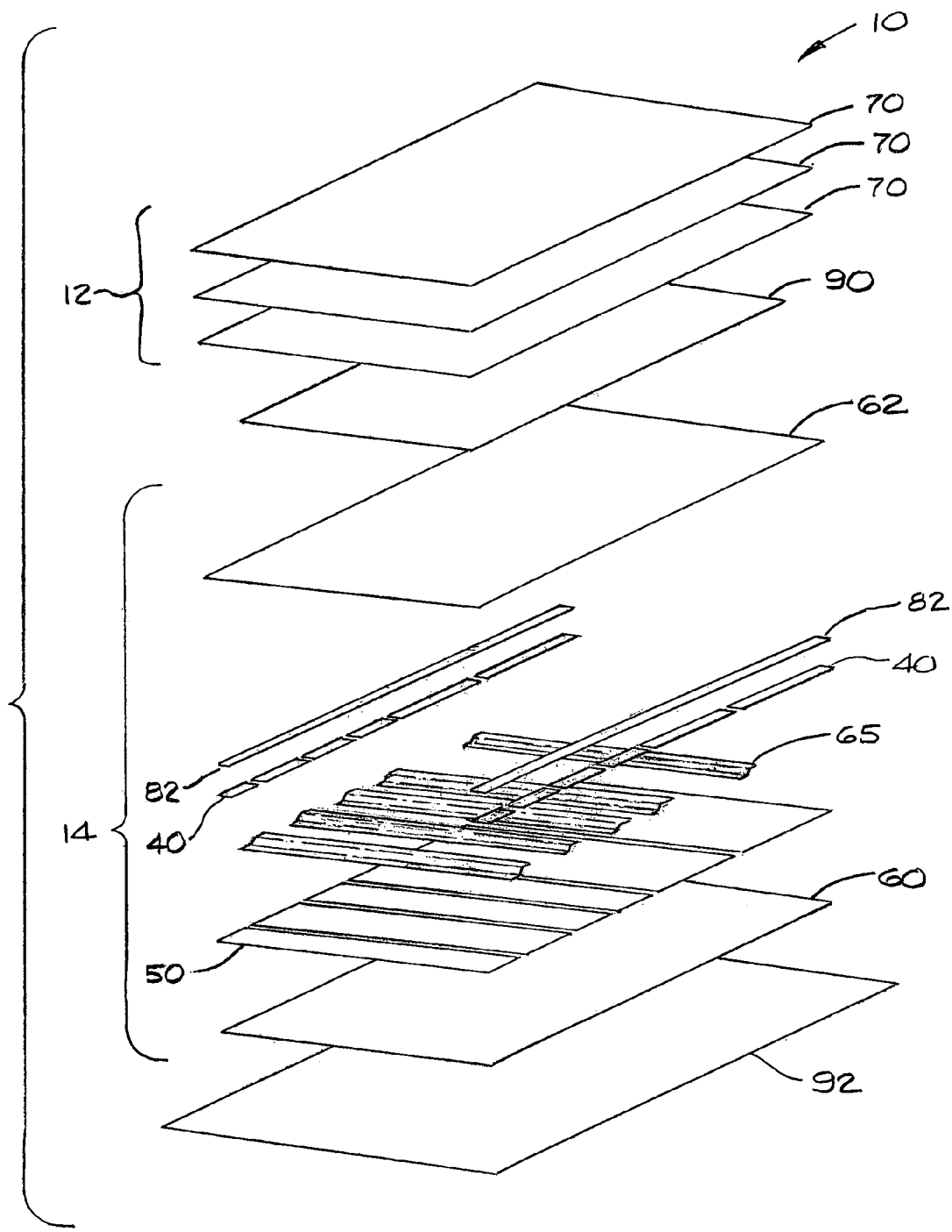
FIG. 8 is an exploded perspective view of the composite heater apparatus of FIGS. 2-6A and 7A showing a lay-up sequence for the composite structure.

As shown in FIGS. 3-5, 6A, 7A and 8, at least one first electrically conductive bus strip 40 is positioned in electrical contact with at least a portion of the electrically conductive sheet 50 proximate to one edge of the sheet 50. As described in detail below, at least one second electrically conductive bus strip 40 is in electrical contact with an opposed portion of the electrically conductive sheet 50 proximate to an opposed edge of the sheet 50. When the electrically conductive sheet 50 includes at least one non-woven electrically conductive fabric sheet having unidirectional electrically conductive threads, the first and second bus strips 40 preferably are placed in electrical contact with opposed edges that correspond to opposed ends of the unidirectional threads. Preferably, the bus strips 40 extend along substantially the full length of the respective opposed edges of the conductive sheet 50. The opposed bus strips 40 permit an electric potential to be substantially uniformly established across the electrically conductive sheet 50 by connecting the bus strips 40, 42 to a suitable power source. Preferably, the bus strips 40 are highly conductive metal strips, such as thin strips of copper or the like. As shown in FIGS. 3-5, 6A, 7A and 8, at least one second electrically insulating layer 62 underlies the conductive sheet layer 50 and the bus strips 40. The second insulating layer 62 may be a layer of pre-impregnated low-dielectric glass fabric such as a single ply of Style 120 or Style 7781 E-glass/epoxy fabric, or any other suitable electrically insulating material. Accordingly, the conductive sheet 50 and bus strips 40 are encapsulated between the insulating layers 60, 62. As shown in FIGS. 3-6A, and in order to minimize the possibility of delamination during service, strips of adhesive material 82 may be disposed between the bus strips 40 and the second insulating layer 62. The strips of adhesive material 82 enhance bonding between the bus strips 40 and the insulating layer 62 after curing. For example, the strips of adhesive material 82 may be strips of FM-300 epoxy adhesive film, available from Cytec Industries, Inc. Hereinafter, the combination of the insulating layers 60, 62, conductive layer 50, bus strips 40, and adhesive strips 82 are collectively referred to as the heater element layers 14 (as shown in FIGS. 6A, 7A and 8).

As shown in FIGS. 7A and 8, the electrically conductive layer 50 may include a plurality of spaced conductive sheets 50. Each of the spaced conductive sheets 50 may form one of a plurality of separate heating elements, such as heating elements 18A-18F as shown in FIGS. 1 and 2. Preferably, adjacent edges of adjacent conductive sheets 50 are sufficiently spaced apart to prevent electrical current from passing between adjacent conductive sheets 50 during service. Alternatively, or in addition, as shown in FIGS. 7A and 8, inter-heater insulating strips 65 may be positioned between adjacent edges of adjacent conductive sheets 50 to electrically isolate adjacent conductive sheets 50 from each other. As shown in FIG. 7A, one edge of each inter-heater insulating strip 65 may extend beneath an edge of a first conductive sheet 50, and an opposed second edge of each insulating strip 65 may extend over an adjacent edge of an adjacent conductive sheet 50. The inter-heater insulating strips 65 preferably are strips of low dielectric glass prepreg fabric, such as Style 120 or Style 7781 fabric. Alternatively, other electrically insulating materials may be used for the insulating strips 65.

As shown in FIGS. 3-4, 5, 6A, 7A and 8, the composite heater apparatus 10 may further include one or more structural layers 70 beneath the heating element layers 14. The structural layers 70 support and reinforce the heating element layers 14, and help to maintain the heater apparatus 10 in a desired contour or shape. The structural layers 70 may be a plurality of stacked pre-impregnated glass/epoxy fabric layers, for example. The structural layers 70 may be adhered to the heating element layers 14 by a suitable layer or film of adhesive material 80. One suitable low-flow adhesive that may be used to form the adhesive layer 80 is a nitrile phenolic adhesive available from 3M Co., for example. Alternatively, the structural layers 70 may be adhered to the heating element layers 14 by bonding together pre-impregnated resins within the insulating layer 62 and within at least one of the structural layers 70 during an elevated-temperature curing cycle.

As shown in FIGS. 2, 4 and 5, the heater apparatus 10 further includes a plurality of spaced openings 30 that extend through the first insulating layer 60, the conductive sheet layer 50, the second insulating layer 62, and the structural layers 70. Though openings also can be provided through the bus strips 40, the bus strips 40 preferably are non-perforated. The openings 30 may provide the conductive layer 50 with a desired degree of electrical resistance, such that when an electrical potential is established across the opposed bus strips 40, a desired degree of thermal energy is emitted from the conductive sheet 50. In addition, as further discussed below, the openings 30 can provide the heater apparatus 10 and an aircraft surface structure 200 incorporating the heating device 10 with desirable noise attenuation characteristics. As shown in FIGS. 2-5, one or more attachment openings 20 may be provided to permit electrical connection of the bus strips 40 to a power source in a conventional fashion.

The invention also includes a method of producing the heater apparatus 10 described above. The process includes assembling the layers of the composite heater structure 10 as shown in FIG. 8, for example. The composite layup and curing steps and processes generally described herein are well known in the art. In a process according to the invention, the first insulating layer 60 can be laid over a layer of suitable peel ply material 92. The peel ply material 92 may be Code 60001 Peel Ply by Richmond Aircraft Products, Inc., for example. At least one sheet of conductive material 50 can be laid on the first insulating layer 60. Preferably, the first insulating layer 60 is oversized, such that excess material extends beyond the outer edges of the conductive sheets 50. When the heater apparatus includes plural sheets of conductive material 50 forming separate heater elements, the sheets 50 should be sized and spaced such that adjacent conductive sheets 50 do not contact each other. For single-phase heaters 10, pairs of opposed bus strips 40 can be placed along edges of the conductive sheets 50 as shown in FIG. 8. Preferably, the bus strips 40 are sized such that they extend along substantially the fill lengths of the opposed edges of their respective conductive sheets 50. Alternatively, for three-phase systems, four separate bus strips 40 may arranged such that one bus strip forms a common ground on a first edge of a conductive sheet 50, and the other three "hot" bus strips 40 are spaced along an opposed second edge of the conductive sheet 50. The bus strips 40 may be overlaid with adhesive strips 82 to enhance bonding with adjacent layers. A second insulating layer 62 can be laid over the conductive sheets 50, bus strips 40, and adhesive strips 82, thus completing lay-up of the heater element layers 14.

In one embodiment of the process, in order to prevent the second insulating layer 62 from adhering to the structural layers 70, a release layer 90 can be laid over the second insulating layer 62. The release layer 90 may be a layer of porous Armalon™ by Du Pont, for example. Next, structural layers 12 comprising one or more reinforcement layers 70 can be laid over the heating element layers 14 and the release layer 90. The stacked layers 12, 14 then can be prepared for curing at an elevated temperature using methods known in the art. Preferably, the stacked layers 12, 24 are placed inside a vacuum bag to extract entrapped air from the lamination. Once the air has been excluded, pressure is applied to compress the stack, and the stack is subjected to elevated temperatures to cause the pre-impregnated epoxy resins to meld and cure.

As discussed above, the heater apparatus 10 may be generally flat in shape, or may have a desired three-dimensional contoured shape like that shown in FIG. 2. When a generally flat shape is desired, the stacked layers may be compressed between substantially flat platens during curing, for example. Similarly, when a non-flat, contoured shape is desired, the stack may be laid up and pressed within a suitably shaped mold to impart the desired three-dimensional shape to the lamination during curing.

Figure 10:
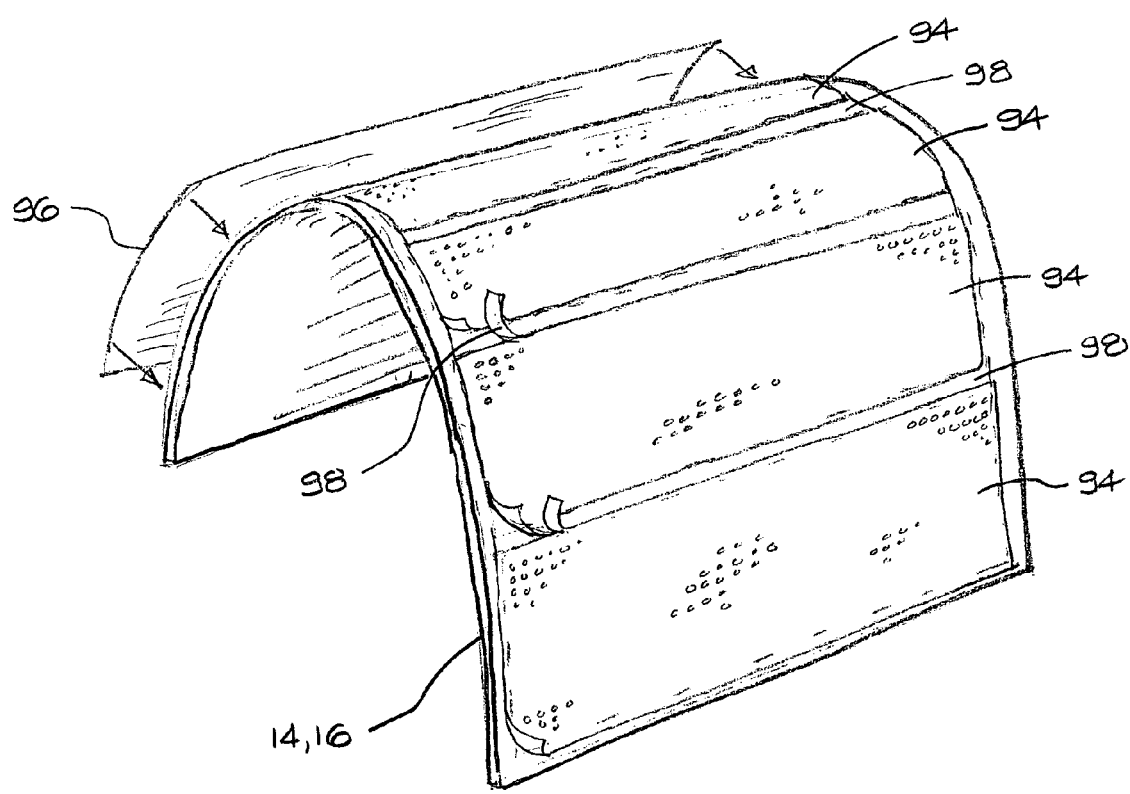
FIG. 10 is a perspective view of the composite structure shown in FIGS. 8-9 with sheets of maskant applied before perforating the composite structure.
Figure 11:
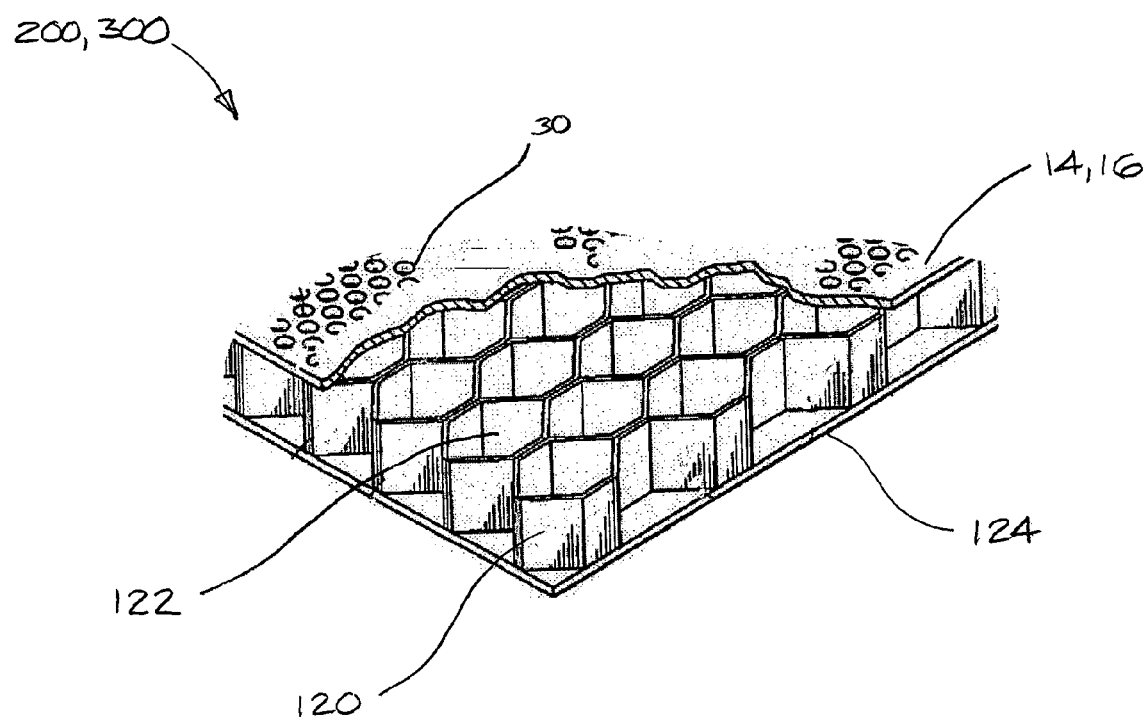
FIG. 11 is a perspective view of a portion of a perforated composite heater apparatus according to the invention assembled over an open-cell honeycomb structure.

After the lamination has been suitably cured, the cured composite can be removed from the mold and vacuum bag, and prepared for perforating. In a preferred process, sheets of perforated maskant 94 can be selectively placed over those portions of the stacked layers that are to be perforated, as shown in FIG. 10. Non-perforated sheets of maskant 96 and non-perforated strips of maskant 98 can be applied to those portions of the stacked layers that do not receive openings. The maskant sheets 94, 96 and maskant strips 98 may be a vinyl masking material available from Diamond Manufacturing, Co., or any other suitable masking material. Once the composite structure has been suitably masked, the masked surface is blasted with conventional techniques using an erosive media such as metal or ceramic particles, or another suitable erosive media. The erosive blasting is continued until the openings 30 extend through the full thickness of the stack at all exposed, non-masked locations. Though erosive blasting is a preferred method of forming the openings 30 in the stacked layers, other suitable perforation processes also may be used. For example, the openings 30 may be formed by mechanical drilling, laser drilling, electron beam drilling, chemical etching, or the like.

After blasting, the maskant 94, 96, 98 is removed, and the edges of the stacked layers can be trimmed to remove any excess material. Where a release layer 90 is included between the heater element layers 14 and the support layers 12, the release layer 90 is removed. Those portions of the heater element layers 14 protected by the non-perforated maskant 96 remain non-perforated after erosive blasting. When desired, a non-perforated region of the heater element layers 14 may be separately masked with a perforated maskant and blasted with an erosive material to perforate that region only with partial openings 32. In this way, at least some portions of the heater element layers 14 may include partial openings 32 that have no corresponding openings in matching portions of underlying support layers 12. These partial openings 32 may be desirable to modify the electrical resistivity of the conductive heating layer 50, without affecting the noise attenuation aspects of the invention. As shown in FIG. 2, such partial openings 32 may be provided in portions of a composite heater 10 where electrical resistance modification is required, but sound attenuation is less important or not required. For example, in the heater apparatus 10 shown in FIG. 2 for use in the nacelle noselip segment 200 shown in FIG. 1, partial openings 32 may be provided in outermost heater elements 18E and 18F, since these outermost heater elements correspond to portions of the nacelle inlet lip that are relatively distant from the noise-generating turbine blades of an associated aircraft engine.

As shown in FIGS. 6A and 7A, after perforating the stacked layers and trimming away any excess material, a layer of adhesive material 80 can be applied between the heater element layers 14 and the support layers 12 in such a manner that the adhesive material 80 does not substantially block the full openings 30. Corresponding openings 30 in the heating element layers 14 and support layers 12 are re-aligned with each other when the two sets of layers 12, 14 are bonded together by the adhesive 80. The layers 12, 14 are again placed in a suitable vacuum bag, and the adhesive 80 is cured at an elevated temperature to form a unitary heater structure 10. After the adhesive 80 is cured, the heater device 10 is finally trimmed of any remaining excess material.

Alternatively, where no release layer 90 is included between the heater element layers 14 and the support layers 12, no adhesive 80 is required, and the epoxy resins of the second insulating layer 62 and the adjacent support layer 70 can be bonded together during the initial curing cycle. Accordingly, the heater device 10 can be finally trimmed after the assembly has been perforated, thereby completing the heater device 10.

Figure 7B:
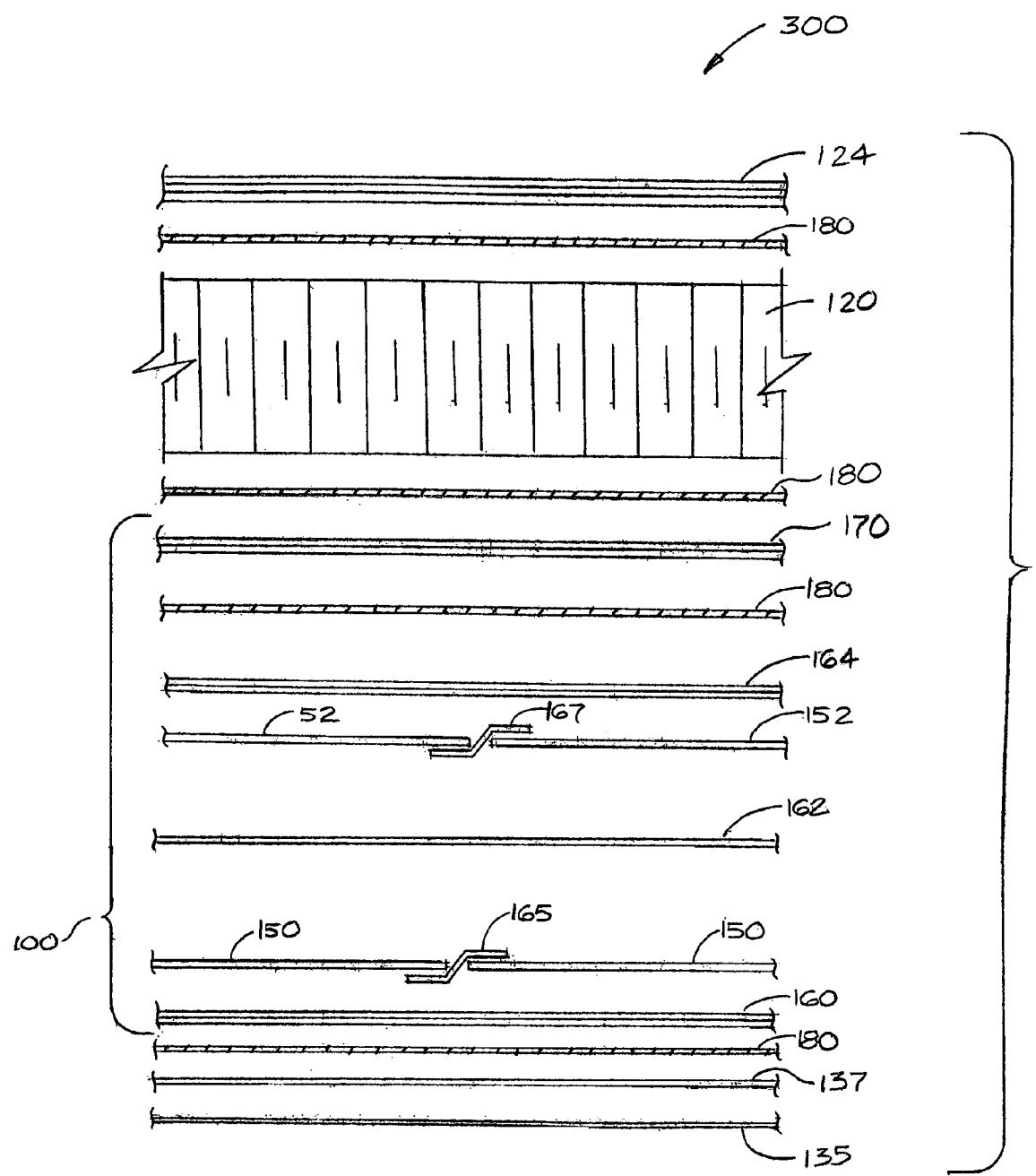
FIG. 7B is an exploded cross sectional view of the embodiment of the composite structure of FIG. 6B as taken along line 7-7 in FIG. 1, showing layers of the composite construction.
Figure 9:
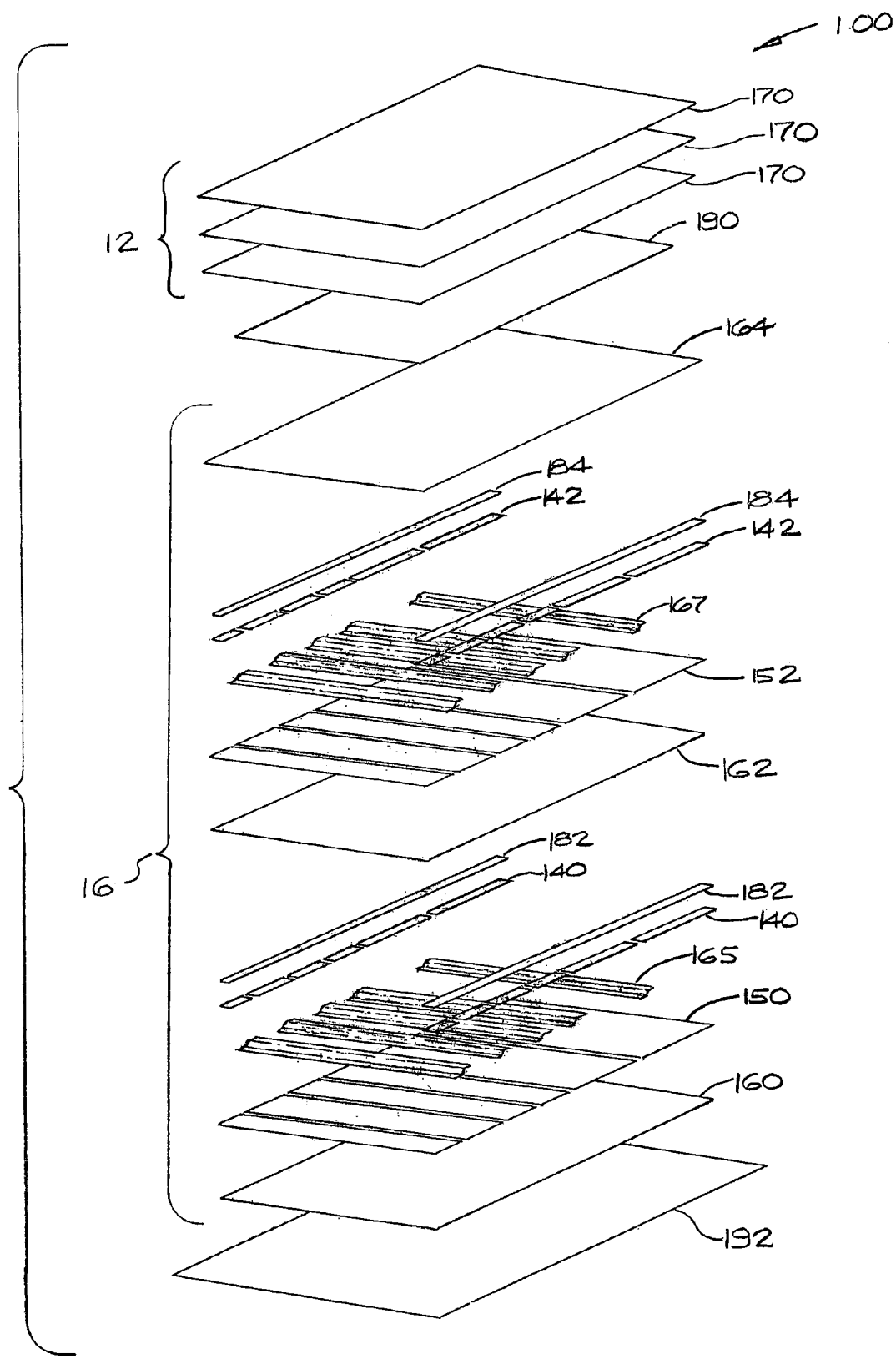
FIG. 9 is an exploded perspective view of the composite heater apparatus of FIGS. 2, 6B and 7B showing a lay-up sequence for the composite structure.

Another embodiment of a heater apparatus 100 according to the invention is shown in FIGS. 2, 6B, 7B and 9. In this embodiment, the heater apparatus 100 includes plural layers of electrically conductive sheets 150, 152 separated by one or more electrically insulating layers 160, 162. Though only two layers of conductive sheet layers 150, 152 are shown in FIGS. 6B, 7B and 9, the heater device 100 may include two or more layers of conductive sheets 150, 152, each separated by one or more insulating layers 160, 162 as desired. The overlapping conductive sheet layers 150, 152 may form redundant heating elements to provide backup heaters in the event one or more of the heating elements formed by one of the conductive sheets 150, 152 becomes inoperative. Alternatively, the heating elements formed by overlapping conductive sheet layers 150, 152 may be selectively energized in any desired combination to generate a desired level of heating from a particular region of the device 100. In addition, the overlapping conductive heater layers 150, 152 may be identically sized and positioned within the heater structure 10 as shown in FIG. 9, or may have different sizes and positions in the structure 10.

The heater apparatus 100 otherwise may be substantially similar to the heater apparatus 10 having a single conductive layer 50 as described above. As shown in FIGS. 6B and 9, electrically conductive bus strips 140, 142 are placed in contact with opposed portions of the conductive layers 150, 152 and permit an electrical voltage to be induced across the conductive heater layers 150, 152. As shown in FIG. 9, inter-heater insulating strips 165, 167 may be provided between adjacent edges of adjacent conductive sheets 150, 152 to minimize the possibility of an electric current passing between adjacent conductive sheets 150, 152 when the sheets are energized. As shown in FIGS. 6B and 9, and in order to minimize the possibility of delamination, strips of adhesive material 182, 184 may be disposed between the bus strips 140, 142 and the adjacent insulating layers 162, 164. The strips of adhesive material 182, 184 enhance bonding between the bus strips 40 and the insulating layer 62 during curing. Hereinafter, the combination of the insulating layers 160, 162, and 164, conductive sheet layers 150, 152, bus strips 140, 142, and adhesive strips 182, 184 are collectively referred to as the heater element layers 16 (as shown in FIG. 9).

The composite heater assembly 100 includes a plurality of spaced full openings 30 therethrough like those described above for heater apparatus 10. The composite heater assembly 100 also may include a plurality of spaced partial openings 32 like those described above for heater apparatus 10. As shown in FIG. 2, one or more attachment openings 20 may be provided in composite heater assembly 100 to permit electrical connection of the bus strips 140, 142 to a power source.

The invention also includes a method of producing the multi-layer heater apparatus 100 described above. In one embodiment, the process includes assembling the layers of the composite heater structure 100 as shown in FIG. 9. A first insulating layer 160 can be laid over a layer of peel ply material 192. At least one sheet of conductive material 150 can be laid over the first insulating layer 160. Preferably, the first insulating layer 160 can be sized such that excess material extends beyond the outer edges of the conductive sheets 150. When the heater apparatus 100 includes plural conductive sheets 150 forming separate heater elements, the sheets 150 can be sized and spaced such that the conductive sheets 150 do not contact each other. Alternatively, or in addition, inter-heater insulating strips 165 can be placed between adjacent conductive sheets 150 as shown in FIG. 7B. The inter-heater insulation strips 165 may be strips of pre-impregnated dielectric glass fabric, or any other suitable electrically insulating material. Pairs of opposed bus strips 140 can be placed along opposed edges of the conductive sheets 150 as shown in FIG. 9, for example. Preferably, the bus strips 140 are sized such that they extend along substantially the full lengths of the opposed edges of their respective conductive sheets 150. In order to enhance the bond between the bus strips 140 and an overlaid adjacent layer 162, adhesive strips 182, 184 may be placed over the bus strips 140, 142 as shown in FIGS. 6B and 9. Next, a second electrically insulating layer 162 can be laid over the layers of conductive sheets 150, bus strips 140, and adhesive strips 182. The lay-up process is continued by adding one or more additional insulating layers 162, one or more additional layers of conductive sheet layers 152, one or additional layers of inter-heater insulating strips 167, one or more additional layers of bus strips 142, one or additional layers of adhesive strips 184, one or more additional insulating layers 164, and so on. A release layer 190 and one or more structural support layers 170 can be laid over the final insulating layer 164. The stacked layers are placed inside a vacuum bag, and compressed and cured at an elevated temperature in the manner described above.

After curing, the composite structure is masked and perforated as described above regarding the single-layer heating device 10. After perforating, the release layer 190, is removed from the lamination, and the separate portions of the structure are adhered together by a suitable adhesive 180 as described above. Alternatively, the release layer 190 may be omitted during lay-up, thereby eliminating the need for adhesive. The heater assembly 100 is finally trimmed to remove excess material. Like the single layer heater device 10 described above, the multi-layer heater assembly 100 may be formed in a substantially flat state, or may be laid up and cured in a suitable mold to impart a desired three-dimensional shape to the heater device 100. For example, the heater device 100 may be molded to have a curved shape that conforms to a nacelle inlet lip, as shown in FIG. 2.

A heater apparatus 10, 100 according to the invention may be incorporated into a surface structure of an aircraft to provide ice protection, or to provide noise attenuation in addition to ice protection. In particular, the heater device 10, 100 can be embedded in an aircraft engine nacelle inlet noselip segment, as shown in FIG. 1. In one embodiment of the invention, the heater device 10, 100 is mounted over an open-cell matrix 120 with a suitable adhesive 80, 180 as shown in FIGS. 6A-7B and 11. The open-cell matrix 120 may be an open-cell honeycomb structure, any other suitable open-cell structure, or any combination thereof. For example, the open-cell matrix layer 120 may include a layer of HexWeb® HRP Flex-Core® available from Hexcel Corporation. One or more non-perforated layers 124 may be attached on the rear surface of the open-cell matrix 120 by a suitable adhesive or adhesive layer 80, 180. The full openings 30 in the heater assembly 10, 100 provide passageways between the exterior of the heater device 10, 100 and the cells 122 of the open-cell matrix 120. Such a construction can provide substantial absorption of acoustic energy by creating Helmholtz resonance. Accordingly, such a structure 200, 300 is particularly suited for use on a nacelle inlet lip to attenuate engine fan noise, and to provide ice protection at the nacelle inlet.

The bus strips 40, 140, 142 of the heater 10, 100 are connected to a suitable power source, and operation of each resistance heating element 50, 150, 152 or combination of heating elements 50, 150, 152 is controlled by a suitable control device as is known in the art. Heat dissipated from the conductive layers 50, 150, 152 of the composite heater 10, 100 can effectively minimize ice accumulation on the associated surface of the aircraft, or can melt or cause the delamination of ice that accumulates on the aircraft surface.

As shown in FIGS. 6A-7B, the outermost surface of an aircraft surface structure that incorporates a composite heater 10, 100 according to the invention may include a durable, acoustically permeable erosion layer 35, 135. In a preferred embodiment, the erosion layer 35, 135 is a micro-perforated titanium foil. For example, the erosion layer 35, 135 may be a 0.008-inch thick titanium alloy foil having a plurality of spaced openings that are about 0.01 inch in diameter, and are spaced apart by about 0.02 inch. The erosion shield 35, 135 shields the composite structure 200, 300 from erosion and damage during service, and provides a substantially smooth aerodynamic outer surface to the structure. The micro-perforations in the erosion layer 35, 135 permit at least some sound waves to pass through the outer surface structure 200, 300, travel through the openings 30 in the underlying composite heater 10, 100, and to enter the open cells 122 of the open-cell layer 120. Alternatively, the erosion shield may include a perforated portion or portions that coincide with an acoustically treated section or sections of the aircraft surface structure, and a non-perforated portion or portions that coincide with a non-acoustically treated section or sections of the structure. In addition, a layer of non-woven scrim cloth 37, 137 may be sandwiched between the composite heater 10, 100 and the erosion layer 35, 135 as shown in FIGS. 6A-7B to further enhance the noise attenuation properties of the structure 200, 300.

Figure 12:
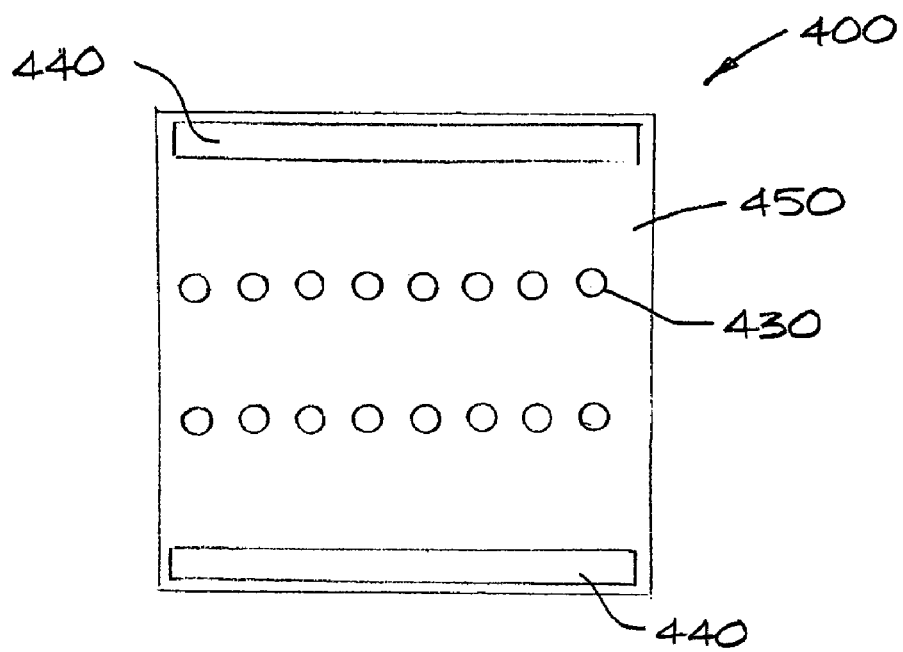
FIG. 12 is a plan view of one embodiment of a composite heater element according to the invention.

As described above, the conductive layers forming the resistance heating elements 50, 150, 152 may be constructed of a woven or unidirectional pre-impregnated fabric or tape including threads containing electrically conductive graphite fibers or another suitable conductive component. As described above, and as shown in FIG. 12, the electrical resistance of a sheet of electrically conductive fabric 450 can be increased by introducing a plurality of spaced openings 430 through the fabric 450. The spaced openings 430 create discontinuities in at least some of the woven threads, thereby interrupting the flow of electrical current through the affected threads when a voltage is applied between the bus strips 440. This interruption of current flow forces an electrical current to seek a more circuitous, less direct conductive path between the bus strips 440, thereby generating resistance heating in the conductive fabric 450.

Figure 13:
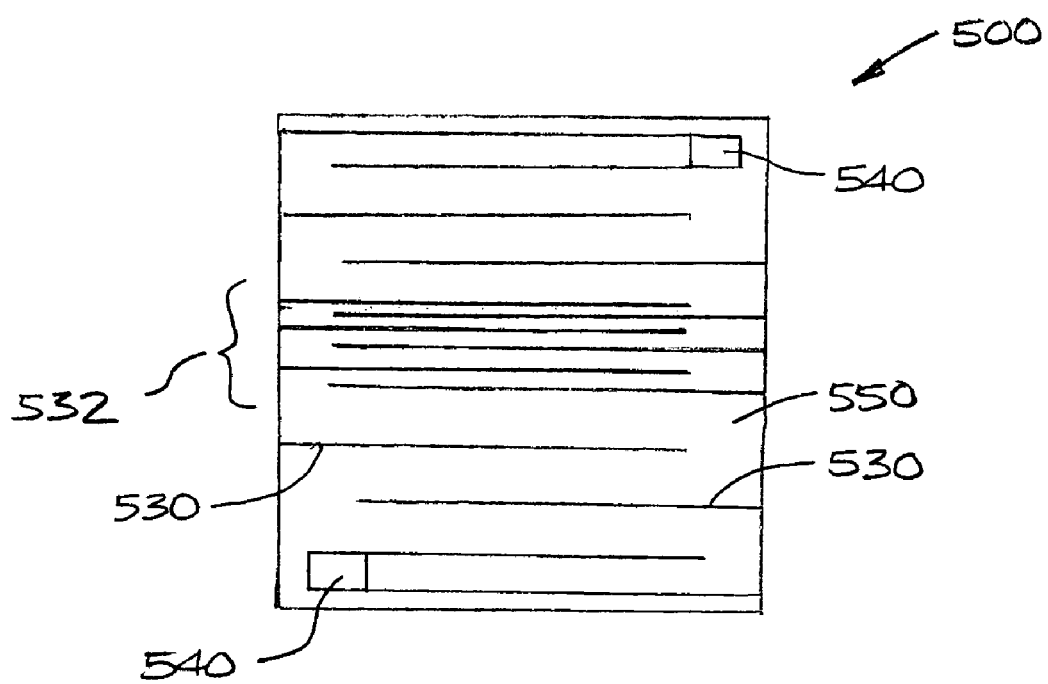
FIG. 13 is a plan view of another embodiment of a composite heater element according to the invention.
Figure 14:
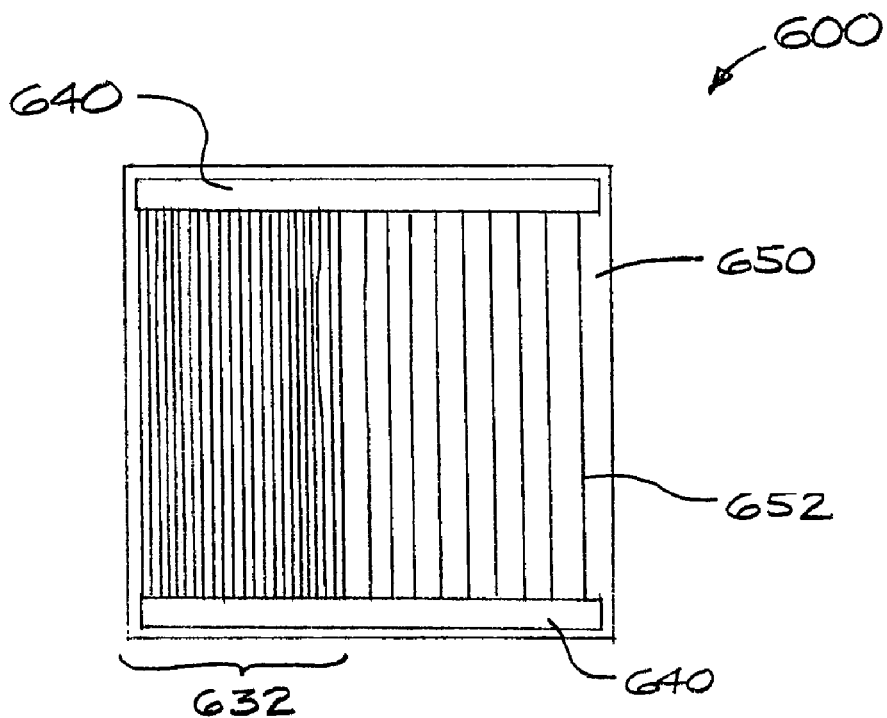
FIG. 14 is a plan view of a further embodiment of a composite heater element according to the invention.

Spaced, open perforations 430 are desirable when a composite heater 10, 100 according to the invention is incorporated into a composite aircraft surface structure 200, 300 like that shown in FIG. 1 that attenuates aircraft noise. Other types of discontinuities in an electrically conductive woven composite fabric also may be used to provide a desired rate of resistance heating from the fabric. As shown in FIG. 13, for example, a plurality of spaced slits 530 may be provided in a woven conductive sheet 550. Like the spaced perforations 430 discussed above, the slits 530 increase the effective electrical resistance to current flow between opposed bus strips 540 when an electric potential is applied between the bus strips 540. As shown FIG. 13, the spacing of slits 530 in woven fabric 550 can be varied to provide varying local electrical resistances across the extent of the woven fabric 550. For example, parallel slits 530 may be closely grouped together in a local region 532 to create an area of relatively high electrical resistivity. This region 532 forms a "hot spot" where the rate of dissipated resistance heating is greater than other areas of the fabric having more widely spaced slits 530. Such a "hot spot" 532 may be desirable along a forward-most portion of a leading edge of an aircraft surface structure, for example, which is susceptible to ice accumulation. Accordingly, the unevenly spaced slits 530 create at least one locally discontinuous property in the weave pattern The invention also includes a composite heater structure including a fabric having a plurality of conductive threads, but without openings such as holes, perforations, slits, or other such discontinuities. As shown in FIG. 14, a composite heater structure 600 according to the invention can include a woven fabric 650 wherein the conductive threads 652 essentially extend in a single direction. The balance of threads forming the woven fabric structure 650 may be non-conductive threads, such as low dielectric glass threads, for example. In the embodiment shown in FIG. 14, conductive threads 652 extend in a warp direction between two opposed bus strips 640. The parallel conductive threads 652 may be equally spaced, or the thread spacing may be closer in one or more regions 632 of the fabric 650 to create different effective local electrical resistances in different portions of the fabric 650. In the embodiment of a composite heater 600 shown in FIG. 14, for example, the effective electrical resistance in that portion 632 of the woven fabric 650 having more closely spaced conductive threads 652 is less than the local electrical resistance in that portion of the fabric 650 having more widely spaced conductive threads 652. Accordingly, when an electrical voltage is applied across opposed bus strips 640, the resistance heating generated from region 632 is less than the heating produced where the conductive threads 632 are more widely spaced. Accordingly, the arrangement of the conductive threads 632 creates at least one locally discontinuous property in the weave pattern.

Figure 15:
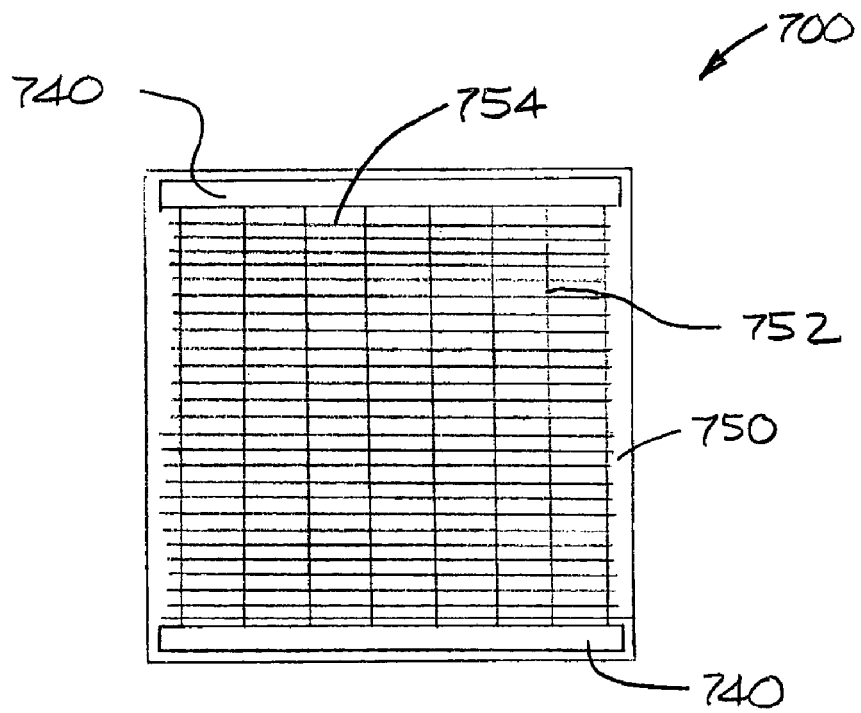
FIG. 15 is a plan view of another embodiment of a composite heater element according to the invention.

The invention also includes a composite heater apparatus 700 as shown in FIG. 15. In this embodiment, the heater 700 includes a sheet of woven fabric 750 including a first plurality of conductive threads 752 extending in a warp direction, for example, and a second plurality of conductive threads 754 extending in a fill direction. As shown in FIG. 15, the spacing (threads per inch) of warp conductive threads 752 in the weave pattern is greater than the spacing (threads per inch) of conductive threads 754 extending in the fill direction. The balance of the weave pattern of the woven fabric 750 includes non-conductive threads, such as glass threads, for example. Because the fabric 750 includes fewer possible conductive paths for current than a composite fabric sheet woven entirely of conductive warp and fill threads 752, 754, the effective electrical resistance of the woven fabric sheet 750 is greater than the resistance of a composite fabric sheet woven entirely of conductive threads 752, 754. Accordingly, when an electric voltage is applied across the opposed bus strips 740, a greater amount of heat is dissipated from the woven sheet 750 than would result if the woven sheet was constructed entirely of conductive threads 752, 754.

In view of the above descriptions of embodiments of the invention, a person of ordinary skill in the art will recognize that certain modifications can be made to the described embodiments without departing from the scope of the invention. For example, though a composite ice protection heater according to the invention has generally been described for use with an aircraft engine nacelle inlet, a heater according to the invention also can be used on other portions of an aircraft where ice protection and/or a perforated or composite heater construction provide beneficial results, such as a wing or other control surface of an aircraft. Alternatively, a composite ice protection heater according to the invention may be used in combination with any structure or surface that requires heating, such as an aircraft floor panel, or the like. In addition, a composite ice protection heater according the invention may include at least some openings that extend through the entire thickness of the heater, may include at least some openings that extend only partially through the thickness of the heater, or both. Alternatively, a composite ice protection heater according to the invention may include a woven or non-woven unidirectional composite fabric or tape including at least some electrically conductive threads, and no openings. In addition, the composite construction of each of the variously described embodiments of the invention may include additional layers or elements not specifically described or shown herein. All such modifications are intended to be within the scope of the appended claims.

What is claimed is:

1. A noise-attenuating ice protection heater of an aircraft component, the heater comprising:
   (a) a pair of electrically insulating layers;
   (b) a plurality of spaced electric heater elements, each heater element comprising a graphite sheet disposed between the insulating layers;
   (c) at least one composite support layer, wherein the electric heater elements, the insulating layers, and the support layer include a plurality of spaced openings therethrough;
   (d) a pair of spaced bus strips in electrical contact with respective opposed portions of each electric heater element;
   (e) an open cell matrix underlying the insulating layers, the heater elements, and the support layer;
   (f) wherein the cells of the open cell matrix are in acoustic communication with the spaced openings;
   (g) wherein the spaced openings are in acoustic communication with an air mass external to the heater and the aircraft component; and
   (h) wherein the electrically insulating layers, the electric heater elements, the support layer, the bus strips, and the open cell matrix are bonded together to form a unitary structure.

2. An ice protection heater according to claim 1 wherein at least one electric heater element comprises a composite graphite sheet.

3. An ice protection heater according to claim 1 wherein at least one of the electrically insulating layers comprises at least one composite glass fabric layer.

4. An ice protection heater according to claim 1 wherein at least one electric heater element comprises:
   (a) a woven fabric sheet comprising a plurality of warp and fill threads arranged in a weave pattern, wherein at least some of the warp threads or the fill threads are electrically conductive;
   (b) wherein the weave pattern includes at least one characteristic that creates at least one locally discontinuous property in the weave pattern.

5. An ice protection heater according to claim 4 wherein the weave pattern includes at least one electrical discontinuity in at least one of the electrically conductive threads.

6. An ice protection heater according to claim 4 wherein the characteristic is an opening through the woven fabric sheet.

7. An ice protection heater according to claim 4 wherein the characteristic comprises at least one slit in the woven fabric sheet.

8. An ice protection heater according to claim 4 wherein the weave pattern includes a plurality of substantially non-conductive threads interwoven with the conductive threads.

9. An ice protection heater according to claim 4 wherein the weave pattern includes a plurality of substantially non-conductive threads interwoven with the conductive threads, and wherein the woven fabric sheet includes a first plurality of conductive threads extending in a warp direction and a second plurality of conductive threads extending in a fill direction.

10. An ice protection heater according to claim 1 wherein the spaced bus strips comprise a pair of metal strips.

11. An ice protection heater according to claim 1 wherein each of the electric heater elements is operable to be selectively energized independent of the other electric heater elements.

12. An ice protection heater according to claim 1, and further comprising at least one control device for regulating a supply of electric power to the electric heater elements.

13. An ice protection heater according to claim 1 wherein the aircraft component comprises at least a portion of an aircraft engine nacelle.

* * * * *